3,579,485
CHLORINATED CARBOXYL GROUP CONTAINING POLY-α-OLEFINS
Paul D. Folzenlogen, Windell C. Watkins, and Hugh J. Hagemeyer, Jr., Longview, Tex., assignors to Eastman Kodak Company, Rochester, N.Y.
No Drawing. Filed Feb. 7, 1969, Ser. No. 797,700
Int. Cl. C08f *3/02, 3/04, 3/08*
U.S. Cl. 260—78.4D
19 Claims

ABSTRACT OF THE DISCLOSURE

This invention relates to chlorinated carboxyl group containing poly-α-olefins which can be prepared by chlorinating a carboxyl group containing poly-α-olefin. These chlorinated poly-α-olefins form primer coatings for use on untreated poly-α-olefin substrates, which can be decorated by printing or painting.

---

This invention relates to chlorinated poly-α-olefins and processes for preparation thereof. One of the aspects of this invention concerns chlorinated poly-α-olefins prepared by chlorinating a carboxyl group containing poly-α-olefin and process for preparation thereof. Another aspect of this invention concerns a chlorinated carboxyl group containing poly-α-olefin which can be used as a primer or as a coating for a substrate.

It is known in the art to prepare chlorinated poly-α-olefins. For example, one such poly-α-olefin is chlorinated polyethylene. One process for preparing chlorinated polyethylene is to prepare a slurry of the polyethylene. The chlorination can then be carried out by passing gaseous chlorine into the stirred slurry of polyethylene until the polyethylene contains the desired amount of chlorine. These chlorinated polyethylenes have been used as primers in the coatings industry. These chlorinated polyethylenes also form coatings which have good toughness, flexibility and chemical resistance. However, the adhesion of these coatings to the substrate is poor, as the coatings can be easily stripped from the substrate. Also it is known in the art to prepare carboxyl containing chlorinated poly-α-olefins as, for example, by simultaneously reacting chlorine and maleic anhydride with polyethylene. While these chlorinated poly-α-olefins may be formed into coatings, these coatings lack adhesion and are not heat stable. It would, therefore, be an advance in the state of the art to provide chlorinated poly-α-olefins capable of forming primers or coatings which not only have good heat stability, toughness, flexibility and chemical resistance, but also have good adhesion to substrates.

Accordingly, it is one of the objects of the invention to provide a novel process for preparing chlorinated poly-α-olefin compositions having improved physical properties.

A further object of the invention is to provide a chlorinated carboxyl group containing poly-α-olefin.

Still another object of the invention is to provide chlorinated carboxyl group containing poly-α-olefins which are capable of forming coatings having an improved combination of physical properties.

One still further object of this invention is to provide chlorinated carboxyl group containing poly-α-olefins which are capable of forming coatings and primers for poly-α-olefin substrates.

Further objects and advantages of the invention will be apparent to those skilled in the art from the following disclosure and claims.

In accordance with this invention, it has been found that carboxyl group containing amorphous and crystalline poly-α-olefins can be chlorinated to produce chlorinated carboxyl group containing poly-α-olefins. The carboxyl group containing poly-α-olefin can be dissolved in an inert solvent and chlorinated with gaseous chlorine. The chlorination can be carried out in the presence of ultraviolet light or a suitable free radical catalyst. These chlorinated carboxyl group containing poly-α-olefins form coatings and primers having improved physical properties and can be used on poly-α-olefin substrates.

The carboxyl group containing poly-α-olefin can be prepared by reacting low viscosity amorphous and crystalline poly-α-olefins prepared from α-olefins containing at least 2 carbon atoms with an unsaturated polycarboxylic acid, anhydrides or esters thereof, preferably in the presence of free radicals. One suitable homopolymeric or copolymeric low viscosity poly-α-olefin can be prepared by thermally degrading conventional high molecular weight poly-α-olefin prepared by conventional polymerization processes. These poly-α-olefins are, for example, high, medium and low density polyethylene, crystalline polypropylene, amorphous polypropylene, polybutene-1, polypentene-1, ethylene/propylene copolymers and the like. For examle, one suitable conventional polymer is the polypropylene prepared according to U.S. Pat. 3,412,078.

Thermal degradation of the conventional homopolymers or copolymers is accomplished by heating at elevated temperatures causing the polymer chain to rupture apparently at the points of chain branching of the polymeric material. The degree of degradation is controlled by reaction time and temperature to give a thermally degraded low molecular weight polymeric material having a melt viscosity range from about 100–5,000 cp. at 190° C. (ASTM–D1238–57T using .04±.0002 inch orifice) and an inherent viscosity of about .1 to .5, measured in Tetralin at 145° C. By carefully controlling the time, temperature and agitation, a thermally degraded poly-α-olefin of relatively narrower molecular weight range than the starting high molecular weight polymer is obtained. The degradation is carried out at a temperature from 290° C. to about 425° C. These low viscosity poly-α-olefins prepared by thermally degrading conventional high molecular weight polymers are not emulsifiable as such; but upon reaction with unsaturated polycarboxylic acids, anhydrides, or esters thereof, the acid number and saponification number are increased to a number greater than 15 to provide an emulsifiable material. If the acid number and the saponification number are less than 15, the material is not emulsifiable.

Another suitable low viscosity poly-α-olefin is prepared by polymerizing to a melt viscosity of from about 100 to 5,000 cp. as measured at 190° C. (ASTM–D1238–57T using .04±.0002 inch orifice). These low viscosity poly-α-olefins are reacted with unsaturated polycarboxylic acids, anhydrides or esters thereof at temperature generally less than 350° C., preferably from about 150–300° C. in the presence of a free radical source which can be used as a catalyst. Suitable free radical sources are, for example, peroxides such as ditertiary butyl peroxide, tertiary butyl hydroperoxide, cumene hydroperoxide, or azo compounds, such as azobis (isobutyronitrile), or irradiation sources. Suitable irradiation sources include, for example, those from cobalt, uranium, thorium, and the like and ultraviolet light. Preferably, about 1 to 10% organic unsaturated polycarboxylic acid, anhydride or esters thereof, based on the weight of the low viscosity polyolefin, can be used in the invention. By using a free radical source, the temperature of reaction is reduced. The amount of peroxide or free radical agent used in generally quite low being of the order of about .01 to about .5% based on the weight of the low viscosity poly-α-olefin. The reaction may be carried out either in a batchwise or in a continuous manner with contact times in the order of about 10 minutes to about 2 hours.

Suitable unsaturated polycarboxylic acids and anhydrides are, for example, maleic acid, maleic anhydride, fumaric acid, citraconic anhydride, aconitic anhydride and itaconic anhydride. Suitable esters are, for example, the half or full esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example. These modified low molecular weight poly-α-olefin compositions have a melt viscosity of 100–5,000 centipoise at 190° C. and a saponification number of at least 6, preferably about 7–30. It has been observed in the present invention that the melt viscosity of the product increases slightly. This increase in melt viscosity may be due to a slight degree of crosslinking or to copolymerization of the wax material with maleic anhydride.

One method for the determination of the saponification number is as follows: Weigh approximately 4 g. of the sample into a 500 ml. alkali-resistant Erlenmeyer flask and add 100 ml. distilled xylene. Heat under a reflux condenser for 1 hour. Cool the solution to 75° C. or less, and add from a buret 30 ml. standardized .10 N KOH in ethyl alcohol. Heat under reflux for 45 min. Cool, and add from a buret standardized .10 N $$CH_3COOH$$

in xylene until the mixture is acid to phenolphthalein. Add at least 1 ml. excess $CH_3COOH$. Reheat the solution under reflux for 15 min. Remove from heat, add 5 ml. water, and titrate to a faint pink end point with .10 N KOH in ethyl alcohol. Run a blank in this manner using the same amounts of reagents and the same heating times.

Calculation:

$$\frac{[(ml. KOH \times N) - (ml. CH_3COOH \times N)] \text{ (for sample)} - [(ml. KOH \times N) - (ml. CH_3COOH \times N)] \text{ (for blank)} \times 56.1}{g. \text{ Sample}}$$

$$= Sap. No.$$

The unreacted unsaturated polycarboxylic acid can be separated from the reaction mixture by purging the reaction mixture with an inert gas while the melt temperature is between 200 and 300° C. After the unreacted unsaturated polycarboxylic acid has been removed, the modified poly-α-olefin can be further purified by vacuum stripping, solvent extraction, or dissolving in an aqueous medium and isolating by removing the solvent or water.

The chlorination procedure is carried out in solution and may be carried out either batchwise or continuously. The solvent used should be one which is inert to elemental chlorine and to hydrogen chloride, which is the principal by-product of the reaction. Suitable solvents include halogenated aromatics and halogenated aliphatics, such as carbon tetrachloride. The solvent must be of a high degree of purity and contain very low amounts, less than about 100 p.p.m., of components which yield ash on burning. The solvent should be colorless and low boiling for easy removal from the polymer product. It is noted that the ash content of the chlorinated, poly-α-olefin product is preferably less than about 0.01% by weight of the polymer.

The concentration of carboxyl group containing poly-α-olefin in the chlorination solvent may be varied, but generally not exceed about 20% by weight, the preferred range being from about 5 to about 12% by weight. Concentrations greater than about 20% provide solutions of high viscosity which are difficult to agitate adequately. The chlorination temperature may also be varied, but at about 160° C. the chlorinated polymer becomes susceptible to degration. At a chlorination temperature of <50° C. the reaction is extremely slow. Generally, the preferred temperature range for the chlorination is from about 50 to about 120° C. In some instances it is desirable that the reaction be carried out under a moderate chlorine pressure in order to increase the solubility of the chlorine in the liquid phase. Generally, the reaction is carried out merely by adding chlorine gas into a well-stirred solution of the poly-α-olefin dissolved in a suitable solvent.

The progress of the chlorination reaction can be followed in a number of ways. The preferred method is to periodically isolate a sample of the chlorinated poly-α-olefin and determine the density of this polymer. The chlorine content is directly related to density and can be determined from a graph showing the amount of chlorine vs. the increase in viscosity. Alternative ways to determine the chlorination is to (1) determine the viscosity of the reaction mixture, or (2) measure the quantity of hydrogen chloride liberated in the course of the reaction. When the desired chlorine content is reached, the polymeric product may be isolated by any of a number of methods well known in the art. The solvent may be removed by stripping with a hot gas or by vacuum distillation.

The chlorinated carboxyl group containing poly-α-olefin is chlorinated until the desired chlorine content is obtained. The chlorinated carboxyl group containing poly-α-olefin for primer use should have a chlorine content of from about 10 to about 30 weight percent, preferably 17 to 20, and, most preferably, 18 weight percent. These chlorinated polymers find particular use as primers for poly-α-olefin surfaces. Chlorinated carboxyl containing polyolefins containing less than 10 weight percent chlorine have solubilities so low as to be undesirable for use as a primer. If the chlorine content is greater than 30 weight percent, the polymer is very soluble and causes the primer coating to redissolve on coating wtih a top coat. The most preferred chlorine content is about 18 weight percent, which provides a chlorinated polymer having not only good solubility, but also forms primer coatings which do not redissolve when a top coat is applied to the primed surface. For use as coatings, the chlorinated carboxyl group containing poly-α-olefin should have a chlorine content of from about 60 to about 70 weight percent, preferably 65 to about 69 weight percent, and most preferably 67 weight percent. These chlorinated polyolefins form excellent coatings on surfaces such as metal surfaces and have good toughness, flexibility, stability, and solvent resistance. Polymers having a chlorine content of less than 60 weight percent form coatings which are too soft, and polymers having a chlorine content of more than 70 weight percent form coatings that are too brittle. In addition to the chlorinated poly-α-olefins, the coating solutions can have incorporated therein typical surface coating or paint additives such as stabilizers, fillers, pigments, plasticizers, resinous modifiers, solvents, and the like.

For use as a primer, the chlorinated carboxyl group containing poly-α-olefin is preferably applied as a solution. The preferred solvents for forming these solutions are aromatic solvents, such as toluene and xylene. The primer solutions contain from about 3 to about 10 percent, by weight, preferably 5 percent, chlorinated carboxyl group containing poly-α-olefin. Solutions containing more than 10 percent are too viscous to spray, and solutions containing less than 3 percent do not contain sufficient chlorinated material to adequately prime the surface onto which it is applied. Solutions containing 5 percent are most preferred since this solution can be easily sprayed onto a surface and contains adequate chlorinated material to prime the surface onto which it is applied.

For use as a coating, the chlorinated material is also preferably applied as a solution. The same solvents used for preparing primer solutions are used for forming coating solutions. The coating solution contains generally from 20 to 50 percent, by weight, preferably 33 percent, of chlorinated material. Solutions containing less than 20 do not contain sufficient chlorinated carboxyl containing poly-α-olefin to form continuous coatings, and above 50 percent are too viscous to form continuous coatings.

It should also be noted that the primer can be added to conventional paint formulations so that the surface to be painted is simultaneously painted and primed.

The chlorinated carboxyl containing poly-α-olefins can be used as primers or coatings on various types of substrates. Such substrates include polyolefins such as polyethylene and polypropylene, and also metal surfaces such as copper wire, aluminum foil, steel, and the like. These primers prepare the surface of articles, such as polyolefins, for painting with conventional lacquer or enamel coatings. These primers also prepare these articles for printing with conventional printing operations. These chlorinated carboxyl group containing polyolefins provide primers for preparing polyethylene surface onto which can be printed a design by conventional printing processes. This eliminates the necessity to prepare the surface of a poly-α-olefin article for printing by treating with flame or corona discharge.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 250 grams of highly crystallizable high molecular weight polypropylene having a heptane index of greater than 95% and an inherent viscosity of about 2.0 was placed in a glass round-bottomed flask. The flask was purged with dry nitrogen to remove air, and it was carefully immersed in a Wood's metal bath maintained at 350° C. After the polymer melted, it was stirred and maintained at 350° C. for about 1 hour. The flask was removed from the metal bath. After the polymer had cooled to about 200° C., it was poured from the flask onto a metal tray. On cooling to about ambient temperature, the hard brittle waxy material was easily granulated and had a melt viscosity of about 3,300 centipoise at 190° C. and an inherent viscosity of about .42.

Low viscosity thermally degraded polymers were also produlced in the above manner from high molecular weight poly-1-butene, poly-1-pentene, poly-1-hexene, poly-1-methyl-1-pentene and poly-1-dodecene.

EXAMPLE 2

About 125 grams of the low viscosity polypropylene prepared according to Example 1 and having a melt viscosity of 3,300 centipoise and an inherent viscosity of about .42 and 7.5 g. of maleic anhydride was placed in a 500 ml., three-necked flask fitted with a metal sweep stirrer, a dropping funnel, and a steam-jacketed condenser to return maleic anhydride which boiled out of the reaction mixture. The flask was lowered into a metal bath whose temperature was controlled at 200° C. After the mixture had melted down, it was stirred and di-t-butyl peroxide (.38 g.) dissolved in 10 ml. of dry heptane was added dropwise from the dropping funnel to the reaction mixture with stirring. About 30 minutes were required to add all of the di-t-butyl peroxide solution in this manner. The reaction mixture was stirred for an additional 30 minutes at 200° C. At the end of this time, the flask was removed from the metal bath and poured into a metal tray. The product was a very light-colored material with no apparent black specks or discolored products in it. The melt viscosity of the final product was 3600 cp. at 190° C., and the extracted saponification number of the product was 16.

EXAMPLE 3

About 250 grams of high molecular weight polyethylene having a density of about 0.918, and a melt index of about 1.0 was placed in a glass, round-bottomed flask. The flask was purged with dry nitrogen to remove air, and it was carefully immersed in a Wood's metal bath maintained at 390° C. After the polymer melted, it was stirred and maintained at 390° C. for about 1 hour. The flask was removed from the metal bath. After the polymer had cooled to about 200° C., it was poured from the flask onto a metal tray. On cooling to about ambient temperature, the hard waxy material was easily granulated and had a melt viscosity of about 2500 centipoise at 150° C. and an inherent viscosity of about 0.2.

EXAMPLE 4

A 1-liter, three-necked flask was equipped with a stirrer, a steam-jacketed condenser, thermometer and nitrogen bleed. The flask was charged with 400 g. of thermally degraded, low-viscosity polyethylene prepared according to Example 3 having a density of about 0.925 and a melt viscosity of 2500 cp. at 150° C. and 20 g. of maleic anhydride. The reaction mixture was melted and stirred at 275° C. for 45 minutes. During the reaction period, the product was maintained under nitrogen. At the end of the reaction period, the mixture was cooled to 200° C. and purged with nitrogen for one hour. The resulting product was light brown in color and was odorless. The product had a melt viscosity of 2600 cp. at 150° C. and a saponification number of 14.

Similar results were obtained when maleic or fumaric acid was used instead of the maleic anhydride.

EXAMPLE 5

A low-viscosity polyethylene prepared directly to a melt viscosity of about 9000 cp. at 150° C. and a density of 0.907 was reacted according to the procedure of Example 4 using a reaction time of 3 hours to produce an emulsifiable product having a melt viscosity of 9,200 cp. at 150° C., an inherent viscosity of 0.37, and a saponification number of 18.8.

EXAMPLE 6

A total of 125 g. of amorphous polypropylene having an I.V. of .27 and 6.3 grams of maleic anhydride was placed in a 300 ml. stainless steel rocking autoclave. The autoclave was purged with dry nitrogen to remove air, and it was heated to 325° C. and maintained at this temperature with rocking for 30 minutes. The product was removed from the autoclave, and the waxy material had an inherent viscosity of .2, a saponification number of about 31.5, a flow point of 64–78° C. and a penetration hardness of 29 (measured with a 50 gram weight for 5 seconds at 25° C.).

Low viscosity maleated polymers were also produced in the above manner from amorphous 50/50 propylene/1 butene copolymer, 95/5 propylene/1-pentene copolymer, 90/10 propylene/1-hexene copolymer, 80/20 propylene/4-methyl-1-pentene copolymer, 75/25 propylene/1-dodecene copolymer and 90/10 1-butene/1-hexene copolymer.

EXAMPLE 7

A total of 125 g. of amorphous 90/10 propylene/1-butene copolymer having a melt viscosity of 3,000 cp. at 190° C. was placed in a glass, round-bottomed flask. The flask was flushed with dry nitrogen and carefully immersed in a metal bath maintained at 325° C. Molten maleic anhydride (6.25 g.) was gradually added over a 15-min. period with stirring. A steam condenser attached to one neck of the flask prevented the loss of maleic anhydride. The reaction mixture was stirred for an additional 30 min. at 325° C., then cooled to 200° C. and poured from the flask onto a metal tray. The light tan product had a melt viscosity at 2975 cp. at 190° C. and an inherent viscosity of .22 and a saponification number of 9.7.

EXAMPLE 8

About 150 grams of low viscosity polypropylene having a melt viscosity of 750 centipoise at 190° C. and 7.5 grams of maleic anhydride were placed in a 500 ml. glass, round-bottom flask and reacted according to the procedure of Example 2. The reaction mixture was heated and stirred at 200° C. for about 1 hour. The product was poured from the flask onto a metal tray. The carboxyl group containing polypropylene had a melt viscosity of 730 centipoise at 190° C. and a saponification number of 30.

Low viscosity polymers were also produced in the above manner from thermally degraded low molecular weight 50/50 propylene/1-butene copolymer, 95/5 propylene/1-pentene copolymer, 90/10 propylene/1-hexene copolymer, 80/20 propylene-4-methyl-1-pentene copolymer, 75/25 propylene/1-dodecene copolymer and 90/10 1-butene/hexene copolymer.

EXAMPLE 9

Two hundred grams of the carboxyl group containing polypropylene of Example 8 were dissolved in 1500 ml. of distilled chlorobenzene and placed in a 3-liter, 3-neck flask fitted with a stirrer and inlet and outlet tubes for chlorine.

Chlorine, at a rate of 2.44 grams per minute, was passed into the stirred mixture for 55 minutes at 115–117° C. The chlorobenzene was vacuum stripped from the polymer and replaced with xylene. A homogeneous solution was obtained. A sample of the solid chlorinated material was isolated and analyzed. The percent chlorine was about 18.

EXAMPLE 10

The chlorinated maleated polyolefin of Example 9 was tested as a primer for untreated polypropylene which was to be top coated with conventional automotive paints.

Two panels of untreated polypropylene were sprayed with a xylene solution of the polymer and then flashed dried (coating thickness 0.5 mil). These were then top coated with conventional automotive paints—one enamel and one lacquer. These panels were dried in an oven at 60° C. for one hour, then tested for adhesion by checking with a razor blade and testing with cellophane tape.

|  | Acrylic Ford enamel topcoat, black | Du Pont acrylic lacquer topcoat, black |
| --- | --- | --- |
| No primer | Lifted, no adhesion | Lifted, no adhesion. |
| Chlorinated maleated polypropylene. | No lifting, excellent adhesion. | No lifting, excellent adhesion. |

EXAMPLE 11

A solution of 20 g. of ethylene-vinyl acetate copolymer, with 30 g. of chlorinated maleated polypropylene having 17.8 percent by weight chlorine was made by stirring the ingredients into 950 g. xylene at 100° C. Upon cooling, the solution was spray applied to molded articles of polypropylene. This coating was air dried for 30 minutes, and the resulting film had a thickness of 0.05 to 0.10 mil. These primed articles of polypropylene were then top coated with a number of commercially available paints and coatings. The adhesion was determined by checking the coating with a razor blade and then seeing if cellophane tape would lift the coating. Excellent adhesion resulted if the coating would not lift. The results were as follows:

|  | Adhesion after aging for 1 week | |
| --- | --- | --- |
| Top coat | Baked on at 110° C. for 20 min. | Dried at 25° C. |
| (1) Alkyd car enamel | Excellent | Excellent. |
| (2) Acrylic car lacquer [1] | do | Do. |
| (3) Acrylic car lacquer [2] | do | Do. |
| (4) Nitrocellulose lacquer [3] | Poor | Do. |
| (5) Polyurethane coatings [4] | Excellent | Do. |
| (6) Styrenated alkyd [5] | do | Do. |
| (7) Soya, safflower alkyd [6] | do | Do. |

[1] Ditzler's Duracryl.
[2] Sherwin-William's L11L-2424 Apex.
[3] Waterlac Finish Co.'s Simulac 800.
[4] Flecto's Verathane.
[5] Kopper's Bycopol S-102-5HV.
[6] Sherwin-William's Excello Glass Black B9-B14.

None of the above coatings would adhere to polypropylene articles which had not been primed. These results indicate that the solution chlorinated polypropylene of this invention is an excellent primer for polypropylene objects to be painted.

EXAMPLE 12

The carboxyl containing poly-α-olefin prepared according to Example 4 is chlorinated according to Example 9. The solid chlorinated material is isolated and, on analysis, shows a chlorine content of 18 weight percent. The chlorinated polyethylene is soluble in xylene; and a 5 percent, by weight, solution is prepared and applied to a film formed from low density polyethylene. The coated polyethylene film is dried at 80° C. for 30 minutes to form a 0.1 mil coating on the polyethylene. One portion of this primed polyethylene film was top coated with a ½ second butyrate top coat. The top coat was dried for 30 minutes at 80° C. The adhesion of this top coat to be primed film was excellent when tested according to Example 10. The butyrate top coat will not adhere to unprimed polyethylene.

The other portion of the primed polyethylene was top coated with a Sherwin-Williams paint formulation known as Excello decorator gloss white soya, safflower oil, alkyd paint. After drying overnight the paint adhered to the primed surface. The paint, however would not adhere to an unprimed polyethylene surface.

EXAMPLE 13

Two hundred grams degraded polypropylene having a melt viscosity of 3,300 centipoise at 190° C. and an inherent viscosity of about .42 and ten grams maleic anhydride and fifteen hundred ml. of distilled chlorobenzene were added to a three thousand ml. flask fitted with stirrer, inlet tube for chlorine extending below the surface of the liquid, and a vent line to the caustic scrubber. This mixture was heated to 117° C. and chlorine bubbled into the solution at 1.46 ml. per minute (2.44 grams per minute). The stirrer was started and chlorine addition continued for 87 minutes. The solution was then degassed with nitrogen and polymer precipitated with methanol. The polymer was washed with MeOH in a Waring Blendor and dried in an oven.

The polymer had 26.9 percent chlorine and infrared analysis did not show the presence of carboxyl groups. When tested as in Example 10, poor adhesion was obtained. This example shows that simultaneous maleation and chlorination did not produce the polymers of this invention.

EXAMPLE 14

Example 9 was repeated with chlorination performed first. Maleation of the chlorinated polymer was attempted, but the material turned black after only 30 minutes of heating and degraded to a sticky mass which could not be isolated. This example shows that a chlorinated poly-α-olefin cannot be maleated.

EXAMPLE 15

Example 9 was repeated except that the chlorine addition was stopped after 25 minutes. The chlorinated product was recovered and, on analysis, shows a chlorine content of 9.2 percent by weight. This chlorinated material was not soluble in either toluene or xylene at 25° C.

EXAMPLE 16

Example 9 was repeated except that the chlorine addition was continued for 1 hour and 50 minutes. The chlorinated product was recovered and, on analysis, shows a chlorine content of 35.5 percent, by weight. The chlorinated material was readily soluble in xylene and toluene. A 5 percent by weight xylene solution of this chlorinated material was prepared and tested according to Example 10. The adhesion of the top coat was poor to the primed film, and there was considerable redissolving of the primer by the top coat.

EXAMPLE 17

Example 9 was repeated except that the chlorine addition was continued for two hours and forty-five minutes. The chlorinated polypropylene resin was recovered by precipitation with methanol and dried. The chlorinated resin contained 62 percent, by weight, chlorine.

A coating was prepared containing 35 percent by weight of this chlorinated resin, 15 percent by weight of a chlorinated biphenyl having a refractive index of 1.639 to 1.641, a pour point of 10° C., and a specific gravity of 1.538, commercially available from Monsanto Chemical Company as Aroclor 1254, and 50 percent toluene.

This coating was applied to a 1/32" steel panel. After drying overnight the coating had the following properties:

Adhesion to steel as determined with cellophane tape:
  (a) Dry test _____ Excellent
  (b) Soaked for 7 hrs. in water _____ Excellent
Sward Hardness, percent of glass[1] _____ 36
Impact strength of film on 1/32-inch steel, in.-lb.:[2]
  (a) Forward _____ >30
  (b) Reverse _____ >30

[1] Determined on I.C.I. Sward Hardness Rocker manufactured by Gardner Laboratory, Inc., Bethesda, Md.
[2] Determined on Gardner Impact Tester manufactured by Gardner Laboratory, Inc., Bethesda, Md.

EXAMPLE 18

Example 9 was repeated except that the chlorine addition was continued for three hours. The chlorinated polypropylene resin was recovered and analyzed. Analysis shows that the chlorinated polypropylene resin contains 66.4 percent, by weight, chlorine.

A coating was prepared containing about 30 weight percent of this chlorinated polypropylene resin, about 13 weight percent ethylene/vinyl acetate copolymer containing 39–42 percent vinyl acetate and having a melt index of 45–65 commercially available as Du Pont's Elvax 40, and about 66 weight percent of xylene.

This coating was tested according to Example 17. The properties of this coating are shown in Table 1.

EXAMPLE 19

200 grams of the amorphous carboxyl group containing polypropylene of Example 6 is chlorinated according to Example 18. The chlorinated amorphous resin obtained had 68.6 percent by weight chlorine. Coatings were prepared and tested according to Example 18. The results obtained are shown in Table 1.

TABLE 1

|  | Examples | |
|---|---|---|
|  | 18 | 19 |
| Percent elongation (conical mandrel) ASTM D-522-60 | >32 | >32 |
| Sward hardness, percent of glass | 30 | 33 |
| Impact strength of 1-mil film on 1/32-inch steel, in.-lb.: |  |  |
| (a) Forward | >30 | >30 |
| (b) Reverse | >30 | >30 |
| Adhesion to steel, cellophane tape test: |  |  |
| (a) Dry test | Excellent | Excellent |
| (b) Wet test | Excellent | Excellent |
| Adhesion to aluminum, cellophane tape test: |  |  |
| (a) Dry test | Excellent | Excellent |
| (b) Wet test | Excellent | Excellent |

EXAMPLE 20

A paint formulation was prepared containing:

Material:                             Weight percent
Chlorinated polyethylene resin of Example 5 containing 66.9% chlorine _____ 14.05
Elvax 40 _____ 7.00
Aroclor 1260 _____ 2.13
Epoxy stabilizer (A-5-Union Carbide Co.) __ .35
Xylene _____ 58.00
TiO$_2$ _____ 18.47

This paint had the following properties:

Viscosity at 250° C., cp. _____ 700
Weight percent solids _____ 42.0
Pigment volume percent _____ 20
Impact strength of coating on 1/32-inch steel, in.-lb.:
  (a) Forward _____ >30
  (b) Reverse _____ >30
Adhesion to steel:
  (a) Dry test _____ Excellent
  (b) Wet test _____ Excellent The paint formulation when applied to a substrate formed a coating which was chemically-resistant and moisture-resistant.

EXAMPLE 21

200 grams of the carboxyl group containing polypropylene prepared according to Example 2 is chlorinated according to Example 18 to a chlorine content of 72 weight percent. Coatings were prepared and tested according to Example 18. The results obtained are shown in Table 2.

EXAMPLE 22

200 grams of the carboxyl group containing polypropylene prepared according to Example 2 is chlorinated according to Example 18 to a chlorine content of 55 weight percent. Coatings were prepared and tested according to Example 18. The results obtained are shown in Table 2.

TABLE 2

|  | Examples | |
|---|---|---|
|  | 21 | 22 |
| Percent elongation | 15 | >32 |
| Sward hardness, percent of glass | 41 | 10 |
| Impact strength of 1 mil film on 1/32-inch steel, in.-lb.: |  |  |
| (a) Forward | 16 | >30 |
| (b) Reverse | 12 | >30 |
| Adhesion to steel, cellophane tape test: |  |  |
| (a) Dry test | Good | Good |
| (b) Wet test | Good | Good |
| Adhesion to aluminum, cellophane tape test: |  |  |
| (a) Dry test | Good | Good |
| (b) Wet test | Good | Good |

Table 2 shows that the adhesion of these coatings to steel and aluminum were not as good as the chlorine containing polymers having a chlorine content of 60 to 70 weight percent. Also, coatings prepared from chlorinated poly-α-olefin containing 55 weight percent chlorine did not have the hardness of the higher chlorinated polymer. The higher chlorinated polymers prepared according to Example 21 do not have the desirable impact of polymers having a chlorine content of 68.6 percent as shown by comparing Table 1 with Table 2.

It is therefore apparent that the chlorinated carboxyl group containing poly-α-olefins of this invention can be used as primers or coatings for various substrates. Such substrates include poly-α-olefins as well as metal surfaces. These chlorinated polymers can be used to prepare polyethylene surfaces for printing, painting or decorating. Furthermore, the coatings prepared with these chlorinated polymers have good physical properties including excellent adhesion to the substrate.

The invention has been described in detail with particular reference to preferred embodiments thereof, but it will be understood that variations and modifications can be effected within the spirit and scope of the invention as described hereinabove and as defined in the appended claims.

We claim:
1. A process for preparing a chlorinated carboxyl group containing poly(α-olefin) which comprises chlorinating in an inert solvent at a temperature in the range between about 50 to 160° C., a carboxyl group containing poly(α-olefin) prepared by reacting a poly(α-olefin) having a melt viscosity of from about 100 to 5000 cp. as measured at 190° C. (ASTM-D1238–57T using .04±.0002 inch orifice) with an unsaturated carboxyl group containing compound selected from maleic acid, maleic anhydride, fumaric acid, citraconic anhydride, aconitic anhydride, itaconic anhydride, or reacted derivatives thereof, whereby said chlorinated carboxyl group containing poly(α-olefin) contains about 10 to 70% by weight chlorine.

2. Process according to claim 1 wherein said poly-α-olefin is polypropylene.

3. Process according to claim 2 wherein said unsaturated carboxyl group containing compound is maleic anhydride.

4. Process according to claim 3 wherein the chlorinated carboxyl group containing polypropylene contains from about 10 to about 30 percent, by weight, chlorine.

5. Process according to claim 1 wherein said poly-α-olefin is polyethylene.

6. Process according to claim 5 wherein said unsaturated carboxyl group containing compound is maleic anhydride.

7. Process according to claim 6 wherein the chlorinated carboxyl group containing polyethylene contains from about 60 to about 70 percent, by weight, chlorine.

8. Process according to claim 6 wherein the chlorinated carboxyl group containing polyethylene contains from about 10 to about 30 percent, by weight, chlorine.

9. Process according to claim 8 wherein said chlorinated carboxyl group containing polyethylene contains 18 percent, by weight, chlorine.

10. Product prepared according to the process of claim 1.

11. Product prepared according to the process of claim 2.

12. Product prepared according to the process of claim 3.

13. Product prepared according to the process of claim 4.

14. Product prepared according to the process of claim 5.

15. Product prepared according to the process of claim 6.

16. Product prepared according to the process of claim 7.

17. Product prepared according to the process of claim 8.

18. Product prepared according to the process of claim 9.

19. The process of claim 1 wherein the concentration of carboxyl containing poly-α-olefin in the inert solvent is in the range between about 5 and 20% by weight.

References Cited

UNITED STATES PATENTS

| 2,825,723 | 3/1958 | Ballauf et al. | 260—94.9 |
| 2,964,517 | 12/1960 | Eck et al. | 260—94.9 |
| 3,326,884 | 6/1967 | King | 260—94.9 |
| 3,481,910 | 12/1969 | Brunson | 260—78.4 |

JOSEPH L. SHOFER, Primary Examiner

W. F. HAMROCK, Assistant Examiner

U.S. Cl. X.R.

260—88.25, 93.7, 94.9H, 94.9GC

PO-1050
(5/69)

UNITED STATES PATENT OFFICE
CERTIFICATE OF CORRECTION

Patent No. 3,579,485                    Dated May 18, 1971

Inventor(s) Paul D. Folzenlogen, Windell C. Watkins, and Hugh J. Hagemeyer, Jr.

It is certified that error appears in the above-identified patent and that said Letters Patent are hereby corrected as shown below:

Column 3, line 67, after "generally" insert ---should---.

Column 3, line 73, "degration" should be ---degradation---.

Column 8, line 19, "be" should be ---the---.

Column 10, line 2, "250°" should be ---25°---.

Signed and sealed this 12th day of October 1971.

(SEAL)
Attest:

EDWARD M. FLETCHER, JR.
Attesting Officer

ROBERT GOTTSCHALK
Acting Commissioner of Patents